US005986542A

United States Patent [19]

Hyde

[11] Patent Number: 5,986,542

[45] Date of Patent: Nov. 16, 1999

[54] VEHICLE ANTI-THEFT METHOD

[75] Inventor: Stephen L. Hyde, Clarkston, Mich.

[73] Assignee: Chrysler Corporation, Auburn Hills, Mich.

[21] Appl. No.: 08/889,813

[22] Filed: Jul. 8, 1997

[51] Int. Cl.[6] .................................................... B60R 25/00

[52] U.S. Cl. ....................... 340/426; 340/425.5; 307/10.4

[58] Field of Search ................................ 340/426, 425.5; 307/10.4, 10.3, 10.2, 10.1

[56] References Cited

U.S. PATENT DOCUMENTS

| | | | |
|---|---|---|---|
| 4,342,024 | 7/1982 | Rossi . | |
| 4,446,380 | 5/1984 | Moriya et al. . | |
| 4,553,511 | 11/1985 | Hayakawa et al. . | |
| 4,638,293 | 1/1987 | Min | 340/693 |
| 4,682,062 | 7/1987 | Weinberger . | |
| 4,736,113 | 4/1988 | Leu . | |
| 4,754,255 | 6/1988 | Sanders et al. . | |
| 4,796,151 | 1/1989 | Asada et al. . | |
| 4,838,377 | 6/1989 | Kozaki et al. . | |
| 4,852,680 | 8/1989 | Brown et al. . | |
| 4,888,575 | 12/1989 | De Vaulx . | |
| 5,006,843 | 4/1991 | Hauer . | |
| 5,079,435 | 1/1992 | Tanaka . | |
| 5,218,338 | 6/1993 | Chang . | |
| 5,444,430 | 8/1995 | McShane | 340/430 |
| 5,467,070 | 11/1995 | Drori et al. | 340/426 |
| 5,481,253 | 1/1996 | Phelan et al. . | |
| 5,554,966 | 9/1996 | Iijima et al. | 340/426 |
| 5,635,901 | 6/1997 | Weinblatt | 340/426 |

*Primary Examiner*—Edward Lefkowitz
*Attorney, Agent, or Firm*—Roland A. Fuller III

[57] ABSTRACT

A method of providing vehicle security against theft involves entering a PIN by using one or more buttons of a preexisting electronic device of a vehicle (an electronic device conventionally found in a vehicle that has a function other than that of providing security against theft, such as a digital odometer, a radio, a compass/information unit, or the like). If the entered PIN does not match a stored PIN, starting of the engine is prevented. Illustratively, the PIN is input into a body controller of the vehicle that compares entered PIN against a stored PIN. If the entered PIN matches the stored PIN, the body controller sends a start enable signal to an engine controller of the vehicle. Upon receipt of the start enable signal from the body controller, the engine controller enables starting of the vehicle so that the vehicle will start when the ignition switch is turned. If the entered PIN does not match the stored PIN, the body controller sends a start disable signal to the engine controller and the engine controller then disables starting of the vehicle so that the vehicle is not allowed to start when the ignition switch is turned.

6 Claims, 4 Drawing Sheets

12 INSTRUMENT CLUSTER
14 BODY CONTROLLER
16 ENGINE CONTROLLER
17 18 20 22 10

VEHICLE ANTI-THEFT METHOD

This invention pertains to vehicle security and anti-theft techniques, and more particularly, to the use of a personal identification number (PIN) to provide enhanced security against theft.

BACKGROUND

Protecting vehicles against theft has become a significant industry. Numerous types of original equipment and after-market vehicles security systems are presently available. Most of these vehicle security systems require that additional hardware be added to the vehicle, such as ignition interlock devices, alarm systems that require shock sensors, and the like.

It is an objective of this invention to provide enhanced vehicle security to protect against theft yet avoid the need to add additional hardware to the vehicle.

It is also an object of this invention to provide enhanced vehicle security in a manner that is simple for the vehicle operator to use.

A method of providing vehicle security against theft according to this invention includes inputting a PIN into a computer of the vehicle by using one or more buttons of a preexisting electronic device of the vehicle. As used herein, "preexisting electronic device" means an electronic device conventionally found in a vehicle that has a function other than that of providing security against theft, such as a digital odometer, a radio, a compass/information unit, or the like. In a preferred embodiment, the preexisting device is a digital odometer and the vehicle's computer is a body controller. If the entered PIN does not match a stored PIN, starting of the engine is prevented. Illustratively, the PIN is input into a body controller of the vehicle that compares entered PIN against a stored PIN. If the entered PIN matches the stored PIN, the body controller sends a start enable signal to an engine controller of the vehicle. Upon receipt of the start enable signal from the body controller, the engine controller enables starting of the vehicle so that the vehicle will start when the ignition switch is turned. If the entered PIN does not match the stored PIN, the body controller sends a start disable signal to the engine controller and the engine controller then disables starting of the vehicle so that the vehicle is not allowed to start when the ignition switch is turned.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

DETAILED DESCRIPTION

In an illustrative embodiment, the method of this invention utilizes a six-digit digital odometer, although odometers having more or fewer digits can also be utilized. A PIN is entered via an odometer button or buttons and compared against a stored PIN. Vehicle starting is enabled if the entered PIN matches the stored PIN and disabled if the entered PIN does not match the stored PIN.

Figure 1:
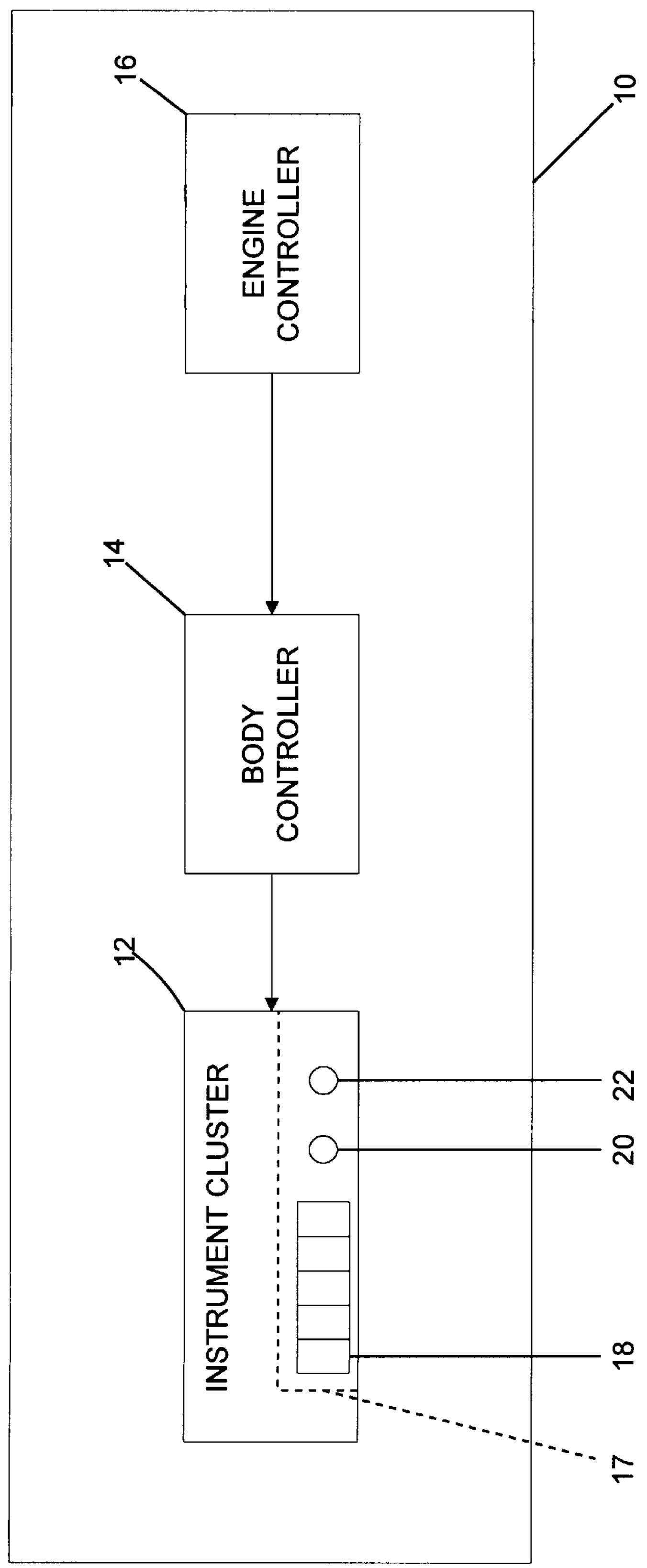
FIG. 1 is a block diagram showing the interconnection among a vehicle's instrument cluster, body controller and engine controller.

Referring to FIG. 1, a vehicle 10 has an instrument cluster 12, body controller 14 and engine controller 16. Instrument cluster 12 includes a digital odometer 17 having a digital display 18, a "trip" button 20 and a "reset" button 22. Instrument cluster 12 (including digital odometer 17) body controller 14 and engine controller 16 are, except for the implementation of the method of this invention, of the type presently used in motor vehicles, such as in certain vehicles manufactured by Chrysler Corporation, the assignee of this application.

In a preferred embodiment, described in more detail below, the vehicle operator presses the "reset" button 22 for five seconds while the digital odometer 17 is in its normal display mode to begin entering the PIN. After five seconds, the digital odometer 17 displays "100000" on digital odometer display 18. The leading "1," which is always "1," is required to display the remaining five digits. This allows for a five digit PIN number to be entered following the "1." Each time the "reset" button 22 of the digital odometer 17 is released, the next digit, illustratively from left to right on digital odometer display 18, is selected. Holding the "reset" button 22 in the pressed position causes the selected digit to be incremented. The vehicle operator then releases "reset" button 22 when the correct number for that digit is displayed. After the last digit has been entered, the five digit PIN is compared against a stored PIN to determine if it is the correct PIN. If it is, the vehicle is allowed to start and if it is not, starting is disabled.

In another embodiment, described in more detail below, the "reset" button 22 is again used to initiate PIN entry, but the "trip" button 20 is used to increment each digit. The vehicle operator presses the "reset" button 22 for five seconds while the digital odometer 17 is in its normal display mode to begin PIN entry. After five seconds, the digital odometer 17 displays "100000" on digital odometer display 18. The operator then presses the "trip" button 20 to increment the selected digit. The operator can either hold the "trip" button 20 pressed, in which case the selected digit increments automatically, or repeatedly press and release the "trip" button 20, in which case the selected digit is incremented each time the "trip" button 20 is pressed. The operator presses the "reset" button 22 to index to the next digit.

Figure 2A:
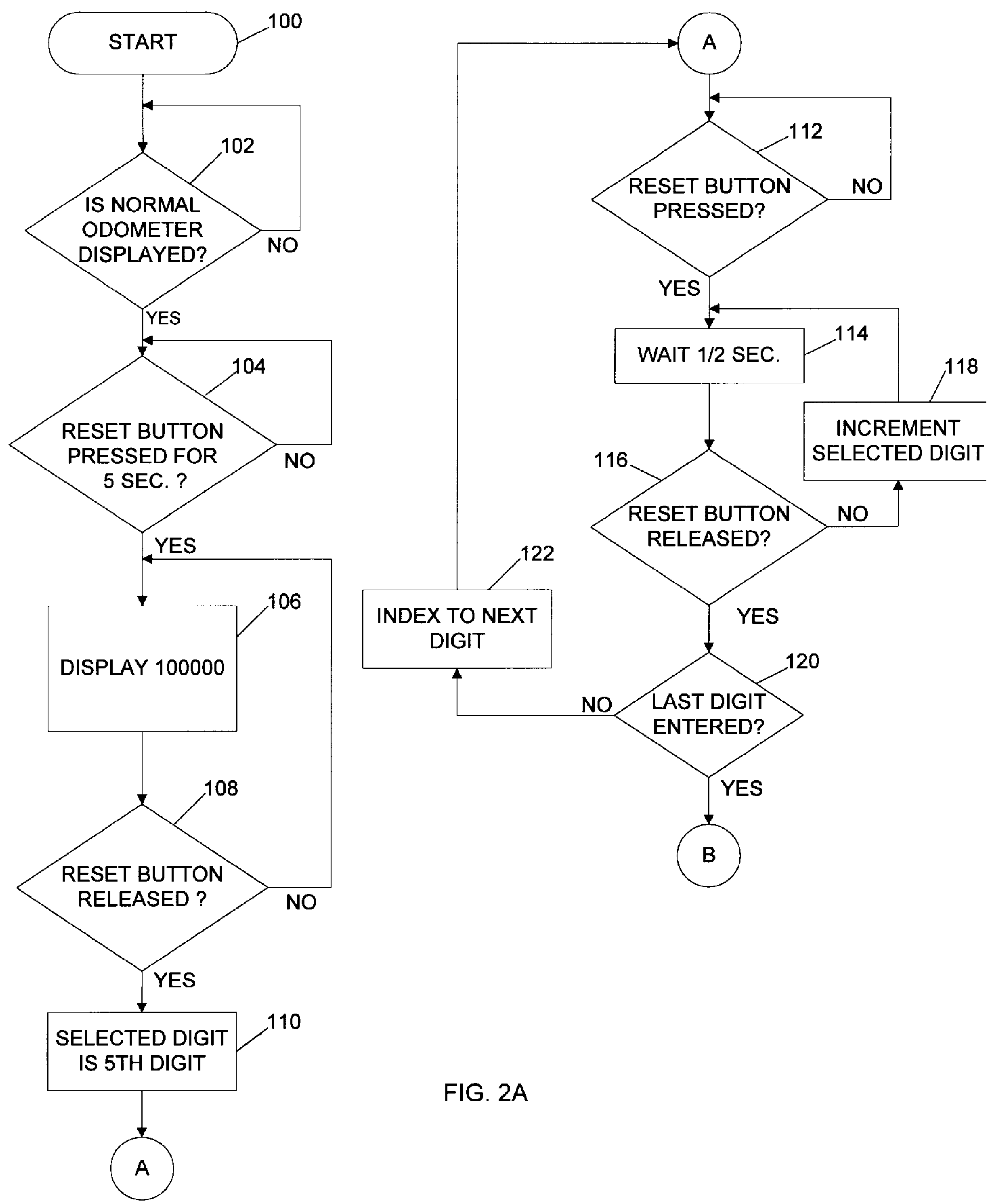
FIGS. 2A–2C are a flow charts computer programs for the body controller implementing the method of this invention.
Figure 2B:
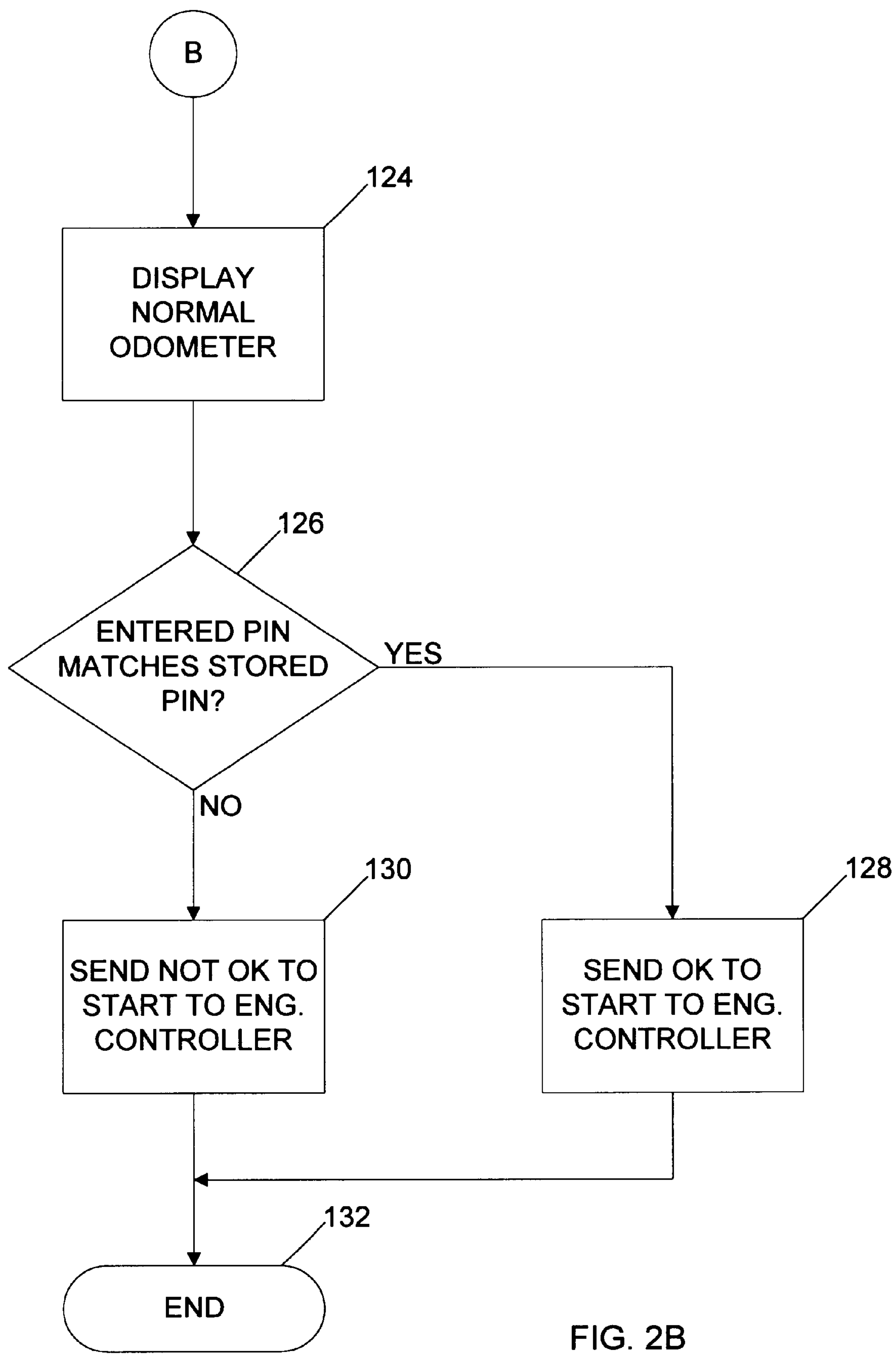

Referring to FIG. 2, a flow chart for the method of this invention is shown. Illustratively, the body controller 14 is programmed with the program shown in FIG. 2. The program starts at step 100 (FIG. 2A) and first checks at step 102 to determine if digital odometer 17 is in its normal display mode where it displays the accumulated vehicle mileage on digital odometer display 18. If it is not, the program loops back and again checks to determine if digital odometer 17 is in its normal display mode. If digital odometer 17 is in its normal display mode, the program next checks at step 104 to determine if the "reset" button 22 has been depressed for five seconds. If it has not, step 104 loops back on itself and again checks to determine if "reset" button 22 has been depressed for five seconds. If "reset" button 22 has been pressed for five seconds, "100000" is displayed on digital odometer display 18 at step 106. The program next checks to see if "reset" button 22 was released at step 108. If not, step 108 loops back on itself and checks again. If step 108 determines that reset button 22 was released, the program sets the "selected digit" to the fifth digit at step 110.

The program next checks to see if "reset" button 22 was pressed at step 112. If not, step 112 loops back on itself and checks again. If "reset" button 22 was pressed, the program waits ½ second at step 114 and then checks to see if the "reset" button 22 was released at step 116. If not, the current digit is incremented at step 118 and the digital odometer display 18 updated accordingly, and the program then loops back to step 114 where it waits ½ second. If step 116 determines that the "reset" button 22 was released, it checks at step 120 to see if the last digit has been entered. If not, the program goes to the index to next digit at step 122 and then back to step 112 where it checks to see if "reset" button was pressed.

If step 120 determines that the last digit has been entered, the program returns digital odometer 17 to its normal display mode at step 124 (FIG. 2B) and at step 126, compares the PIN that has just been entered using the "reset" button 22 against a stored PIN, illustratively stored in a memory of body controller 14. If the entered PIN number matches the stored PIN number, the program branches to step 128 where it sends an "OK to Start" message to engine controller 16 and then branches to end at step 132. Upon receipt of the "OK to Start" message, engine controller 16 enables starting so that vehicle 10 can be started when the ignition switch (not shown) is turned. If step 126 determines that the entered PIN did not match the stored PIN, it sends a "Not OK to Start" message to engine controller 16 at step 130 and then branches to end at step 132. Upon receipt of the "Not OK to Start" message, engine controller 16 disables starting of vehicle 10 so that it cannot be started.

Figure 2C:
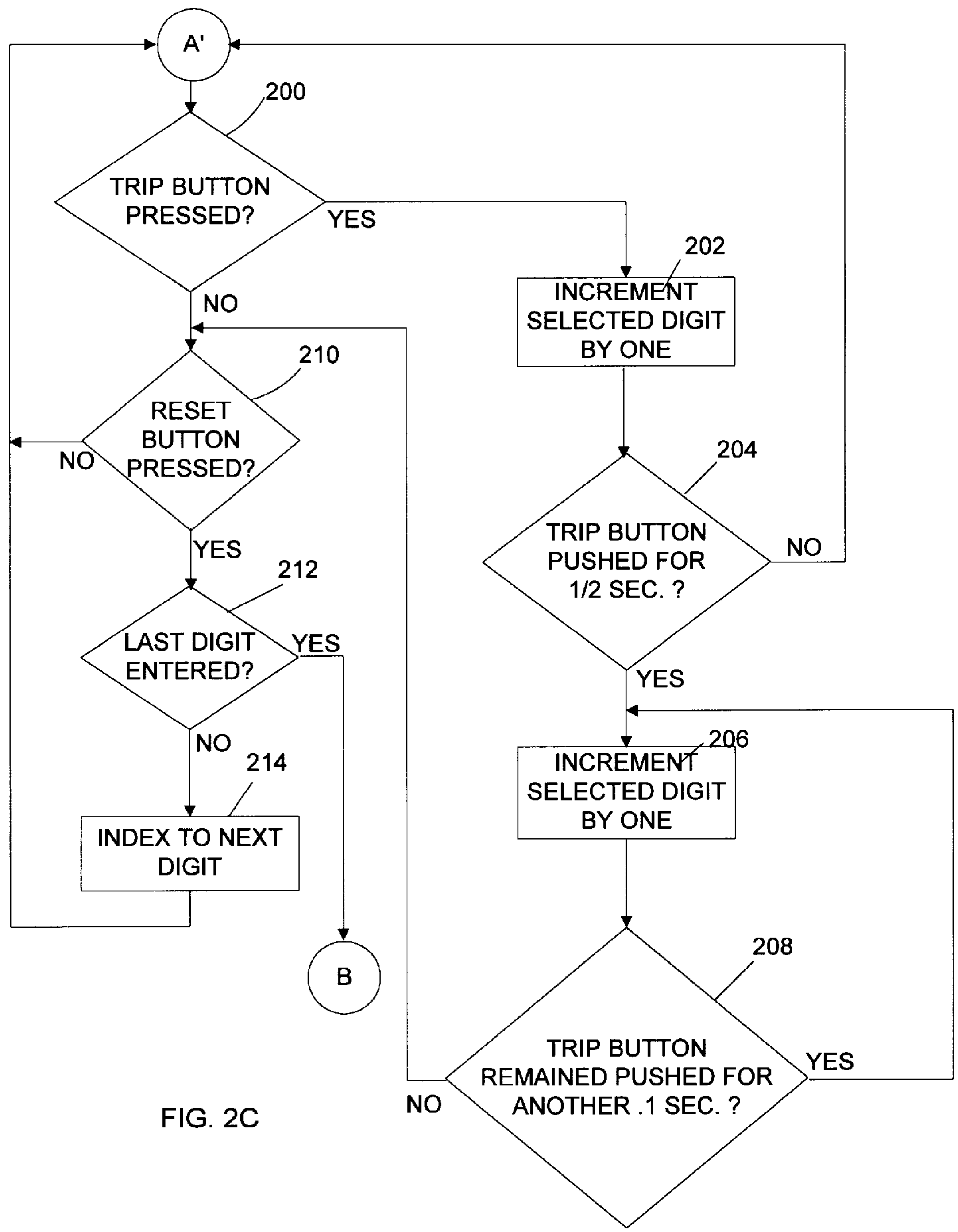

Referring to FIG. 2C, the embodiment in which the "trip" button 20 is used to increment the PIN digits is described. The program executes steps 100–110 of FIG. 2A and after executing step 110, branches to step 200 (FIG. 2C) as opposed to step 112. At step 200, the program checks to see if the "trip" button 20 was pressed. If not, the program branches to step 214, described below. If it was, the program branches to step 202 where the selected or current digit is incremented by one. At step 204, the program checks to see if the "trip" button 20 was released. If so, the program branches to step 214. If not, the program checks to see if the "trip" button 20 has been held pushed for ½ second at step 206. If "trip" button 20 has not been held pushed for ½ second, the program branches back to step 204. If it has, the program increments the selected digit by one at step 208 and then checks at step 210 to see if the "trip" button 20 was released. If so, the program branches to step 214. If not, the program then checks to see if the "trip" button 20 has been held pushed for another predetermined period, such as 0.25 second. If it has, the program loops back to step 208 where the selected digit is incremented by one. If it has not, the program branches to step 210.

If the program at step 200 determines that the "trip" button 20 was not pressed, it then goes on to step 214 where it checks to see if the "reset" button 22 was pressed. If step 214 determines that the "reset" button 22 was not pressed, the program loops back to step 200. If the "reset" button was pressed, then the program checks at step 216 to determine if the last digit was entered. If not, the program indexes to the next digit of the PIN at step 218 and, after waiting for the "reset" button 22 to be released at step 220, loops back to step 200. If the last digit was entered, then, after waiting for the "reset" button 22 to be released at step 222, the program branches to step 124 (FIG. 2B) and continues as described previously.

While five seconds provides a preferred and unmistakable period of time for the body controller 14 to recognize that the user wishes to enter the PIN, other suitable variations may also be provided in the appropriate application. For example, other suitable periods of time can be used. Also, pressing both the "trip" button 20 and the "reset" button 22 simultaneously could be used to initiate PIN entry. Similarly, the user attempting to turn the ignition key could initiate PIN entry. In any of these cases, no additional hardware is required, and body controller 14 is still provided with a uniquely identifiable way to initiate its security checking sequence.

Another advantage of the present invention is that a digital odometer is not a vehicle component that a person might ordinarily associate with vehicle security. Accordingly, the interaction between the digital odometer button or buttons and the body controller 14 provides a highly unusual technique for controlling vehicle security. However, other user input devices connected to the body controller 14 may also be utilized, such as the buttons on an overhead compass/information unit or on a radio. In this way, a potential thief may not even know where to begin entering a PIN, let alone know what PIN to enter. It should also be appreciated that the number of digits of the PIN may be varied in the appropriate application.

Although the invention has been described in detail with reference to certain preferred embodiments and specific examples, variations and modifications exist within the scope and spirit of the invention as defined in the following claims.

What is claimed is:

1. A method of providing vehicle security in a vehicle having a computer and an odometer having a reset button and a trip button, comprising the steps of:

a. entering a personal identification number (PIN) into the computer of the vehicle by at least one of the reset and trip buttons of the odometer;

b. comparing the entered PIN to a PIN stored in a memory of the vehicle's computer;

c. enabling starting of the vehicle if the entered PIN matches the stored PIN; and disabling starting of the vehicle if the entered PIN does not match the stored PIN.

2. The method of claim 1 wherein the odometer comprises a digital odometer having a digital display, the odometer button used to enter the PIN comprises the reset button, the step of the PIN being entered comprises a. selecting the first digit of the PIN to be entered after the reset button is pressed for a predetermined time;

b. displaying the selected digit on the digital display of the digital odometer;

c. incrementing the selected digit in response to the reset button remaining pressed;

d. incrementing to the next digit upon release of the reset button;

e. repeating steps b–d until the last digit of the PIN has been entered; and the step of comparing the entered PIN against the stored PIN comprises doing so after the last digit of the PIN has been entered.

3. The method of claim 2 wherein the vehicle's computer includes a body controller coupled to the digital odometer and the stored PIN is stored in a memory of the body controller.

4. The method of claim 1 wherein the odometer comprises a digital odometer having a digital display, the step of the PIN being entered comprising:

a. selecting the first digit of the PIN to be entered after the reset button is pressed for a predetermined time;

b. displaying the selected digit on the digital display of the digital odometer;

c. incrementing the selected digit each time the trip button is pressed or in response to the trip button remaining pressed;

d. incrementing to the next digit upon the reset button being pressed again; and e. repeating steps b–d until the last digit of the PIN has been entered; the step of comparing the entered PIN against the stored PIN comprises doing so after the last digit of the PIN has been entered.

5. The method of claim 3 wherein the vehicle includes an engine controller, the steps of enabling and disabling starting of the vehicle include the body computer sending signals to the engine controller indicative of whether the entered PIN matched the stored PIN, the engine controller disabling starting of the vehicle when the signals from the body computer indicate that the entered PIN did not match the stored PIN and enabling starting of the vehicle when the signals from the body computer indicate that the entered PIN matched the stored PIN.

6. The method of claim 4 wherein the vehicle includes an engine controller, the steps of enabling and disabling starting of the vehicle include the body computer sending signals to the engine controller indicative of whether the entered PIN matched the stored PIN, the engine controller disabling starting of the vehicle when the signals from the body computer indicate that the entered PIN did not match the stored PIN and enabling starting of the vehicle when the signals from the body computer indicate that the entered PIN matched the stored PIN.

* * * * *